United States Patent
Andrew et al.

(10) Patent No.: US 6,473,769 B1
(45) Date of Patent: Oct. 29, 2002

(54) PROPERTY LINKING IN OBJECT-ORIENTED COMPUTING ENVIRONMENTS

(75) Inventors: Felix G. T. I. Andrew, Seattle; David A. Sobeski, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/282,649

(22) Filed: Mar. 31, 1999

(51) Int. Cl.$^7$ .............................................. G06F 17/30
(52) U.S. Cl. ........................................ 707/103; 707/10
(58) Field of Search .................. 707/100–104.1, 707/10

(56) References Cited

U.S. PATENT DOCUMENTS

| | | | |
|---|---|---|---|
| 5,469,555 A | 11/1995 | Ghosh et al. | 711/133 |
| 5,524,234 A | 6/1996 | Martinez et al. | 711/141 |
| 5,594,886 A | 1/1997 | Smith et al. | 711/136 |
| 5,608,909 A | 3/1997 | Atkinson et al. | 717/3 |
| 5,625,794 A | 4/1997 | Inoue et al. | 711/138 |
| 5,692,187 A | 11/1997 | Goldman et al. | 707/203 |
| 5,740,455 A | 4/1998 | Pavley et al. | 707/515 |
| 5,787,442 A * | 7/1998 | Hacherl et al. | 707/201 |
| 5,815,648 A | 9/1998 | Giovannetti | 714/5 |
| 5,892,949 A | 4/1999 | Noble | 717/4 |
| 5,951,680 A | 9/1999 | Redlin et al. | 713/1 |
| 5,956,508 A | 9/1999 | Johnson et al. | 709/315 |
| 6,101,500 A | 8/2000 | Lau | 709/223 |
| 6,104,963 A | 8/2000 | Cebasek et al. | 700/86 |
| 6,304,879 B1 * | 10/2001 | Sobeski et al. | 707/103 |

FOREIGN PATENT DOCUMENTS

| | | | |
|---|---|---|---|
| EP | 0660231 | 12/1994 | G06F/9/44 |
| EP | 0817037 A | 6/1996 | G06F/9/46 |
| EP | 0762273 | 9/1996 | G06F/9/44 |
| EP | 0833259 A | 9/1996 | G06F/17/30 |
| EP | 0757313 | 2/1997 | G06F/9/44 |
| WO | 98/21651 | 11/1996 | G06F/9/44 |

OTHER PUBLICATIONS

Rumbaugh et al., Controlling propagation of operations using attributes on relations, Proc., of the object oriented programming systems languages and applications conf., XP000299836, 285–296, Sep. 1998.*

Box, D., "Essential COM", 1997 (ISBN 0-201-63446-5), pp. 1–420, (1997).

Taylor, D.A., "Object Technology: A Manager's Guide", (2d ed. 1997) (ISBN 0-201-30994-7), pp. 1–198, (1997).

International Search Report—PCT/US 99/ 24357, 4 pages, (Mar. 14, 2000).

International Search Report—PCT/US 99/ 24358, 4 pages, (Mar. 14, 2000).

International Search Report—PCT/US 99/ 24343, 4 pages, (Mar. 14, 2000).

(List continued on next page.)

Primary Examiner—Kim Vu
Assistant Examiner—Jean Bolte Fleurantin
(74) Attorney, Agent, or Firm—Christensen O'Connor Johnson Kindness PLLC

(57) ABSTRACT

Property linking for object-oriented computing environments. In one embodiment, a computer-implemented method including first linking a second property of a second object to a first property of a first object, according to a predetermined criteria. When an event occurs regarding a change in the first property, the change is examined in relation to the predetermined criteria, to determine whether the change in this property necessitates a change in the second property. If it does, then the second property is changed in accordance with the predetermined criteria.

12 Claims, 4 Drawing Sheets

OTHER PUBLICATIONS

IBM, "Heterogeneous object model–view relationships", *IBM Technical Disclosure Bulletin*, vol. 33, No. 68, 242–243, (Nov. 1, 1990).

IBM, "Highly Flexible Property Abstraction Framework of Non–restricted System Object Model Objects", *IBM Technical Disclosure Bulletin*, vol. 37, No. 9, XP000473417, 287, (Sep. 1, 1994).

IBM, "Objects with Multi–Personality", *IBM Technical Disclosure Bulletin*, vol. 37, No. 9, 661, (Sep. 1, 1994).

Ishimaru, T., et al., "An Object–Oriented Data Model for Multiple Representation of Object Semantics", *Systems & Computers in Japan, Scripta Technica Journals*, NY, vol. 27, No. 9, 23–32 (Aug. 1, 1996).

Jaaksi, A., "Implementing Interactive Applications in C++", *Software Practice & Experience*, GB, John Wiley &Sons Ltd. Cichester, vol. 25, No. 3, 271–289, (Mar. 1, 1995).

Lin, L., et al., "Dynamic window configuration in an object oriented programming environment", *Proceedings of the Annual Int'l computer Software & Applications Conf., IEEE, Comp. Soc. Press*, vol. Conf. 13, 381–388, (1989).

International Search Report—PCT/US 00/06727, 8 pages, (Aug. 9, 2000).

Hamilton, G., "JavaBeans 1.01 specification", *Sun Microsystems*, XP002130316, Mountain View, CA, 40–52, (Jul. 24, 1994).

IBM, "Linking the slot values of different objects", *IBM Technical Disclosure Bulletin*, vol. 38, No. 7, XP000521684, 261, (Jul. 24, 1994).

Rumbaugh, J., "Controlling propagation of operations using attributes on relations", *Proc. of the Object oriented programming systems languages and applications conf.*, XP000299836, 285–296, (Sep. 25, 1988).

Edenfield, R., et al., "The 68040 on–chip memory subsystem", *35th IEEE Computer Soc. Int'l Conf.*, 264–269 (1990).

Hwang, S.H., et al., "On–chip cache memory resilience", *IEEE, High–Assurance Systems Engieering Symp.*, Third IEEE Int'l, 240–247, (1998).

Mekhiel, N.N., et al., "Performance analysis for a cache system with different DRAM designs", *Electrical and Computer Engineering*, 365–368, (1993).

* cited by examiner

PROPERTY LINKING IN OBJECT-ORIENTED COMPUTING ENVIRONMENTS

RELATED APPLICATIONS

This application is related to the following copending and coassigned applications, which were all previously filed on Nov. 25, 1998, and which are hereby incorporated by reference: "Object Model for Object-Oriented Computing Environments," [Ser. No. 09/200,489]; to now U.S. Pat. No. 6,304,879 "Dynamic Data Cache for Object-Oriented Computing Environments," [Ser. No. 09/200,674]; and "Dynamic Object Behavior for Object Oriented Computing Environments" [Ser. No. 09/199,604].

FIELD OF THE INVENTION

This invention relates generally to object-oriented computing environments, and more particularly to linking properties in such environments.

BACKGROUND OF THE INVENTION

Object-oriented programming environments are currently the standard environment in which computer programs are developed. For example, within the Microsoft Windows operating system, programs may be developed using the Component Object Model (COM) architecture. Object-oriented programming environments provide a modular manner by which developers can develop complex and sophisticated computer programs.

Generally, an object may include data and methods by which that data is accessed and changed. Thus, new methods may be added to the object for accessing and changing the data in other ways not previously possible, without affecting existing methods, and the external objects that rely on these existing methods. Upon receiving a message, or in response to an event, an object typically executes a particular method, resulting in the data within that object being retrieved or changed.

Object-oriented environments provide end users with advantages over other environments, especially when they are used in the context of graphical user interfaces (GUI's). Rather than memorizing a sequence of keystrokes to save a file, for example, a user in a graphical user interface may instead only have to pull down a file menu, and choose the save option. A dialog box then may appear, allowing the user to enter in the name of the file to be saved, and after which the user clicks an "OK" button to actually save the file.

However, object-oriented environments in the context of GUI's can at times make the programming process more difficult for programmers who have to develop the end-user applications. In the example just described, for instance, the programmer may wish to have the "OK" button initially disabled before the user has entered in the name of a file to be saved in a text box, to indicate that until a name is entered, the program cannot actually perform the save operation. Then, when the user starts entering a name in the text box, desirably the programmer may wish the "OK" button to become enabled. Under the prior art, this is difficult to accomplish without increased programming development on the part of the programmer, which results in increased overhead for the application program.

For these and other reasons, there is a need for the present invention.

SUMMARY OF THE INVENTION

The invention provides for property linking for object-oriented environments. In one embodiment, a computer-implemented method includes first linking a second property of a second object to a first property of a first object, according to a predetermined criteria. When an event occurs regarding a change in the first property, the change is examined in relation to the predetermined criteria, to determine whether the change in this property necessitates a change in the second property. If it does, then the second property is changed in accordance with the predetermined criteria.

Embodiments of the invention provides for advantages not found in the prior art. For instance, with respect to the example described in the background section, an "OK" button and a text box may each be a different object (or, container or control, depending on the nomenclature of a given object-oriented object model). Whether the "OK" button is disabled or enabled may be a property of the "OK" button object, while whether the text box is empty or contains text may be a property of the text box object. The disabled property of the "OK" button object is linked to the empty property of the text box object, such that if the latter is TRUE (indicating that the text box is empty), the former is TRUE as well (indicating that the "OK" button object is disabled). When an event occurs indicating that the empty property of the text box object changes—for example, to FALSE once a user has entered input into the box—then an evaluate method of one embodiment of the invention determines whether this change necessitates a change to the disabled property, too. Thus, the disabled property changes to FALSE (indicating that the "OK" button should be enabled) incident to the empty property changing.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Hardware and Operating Environment

Figure 1:
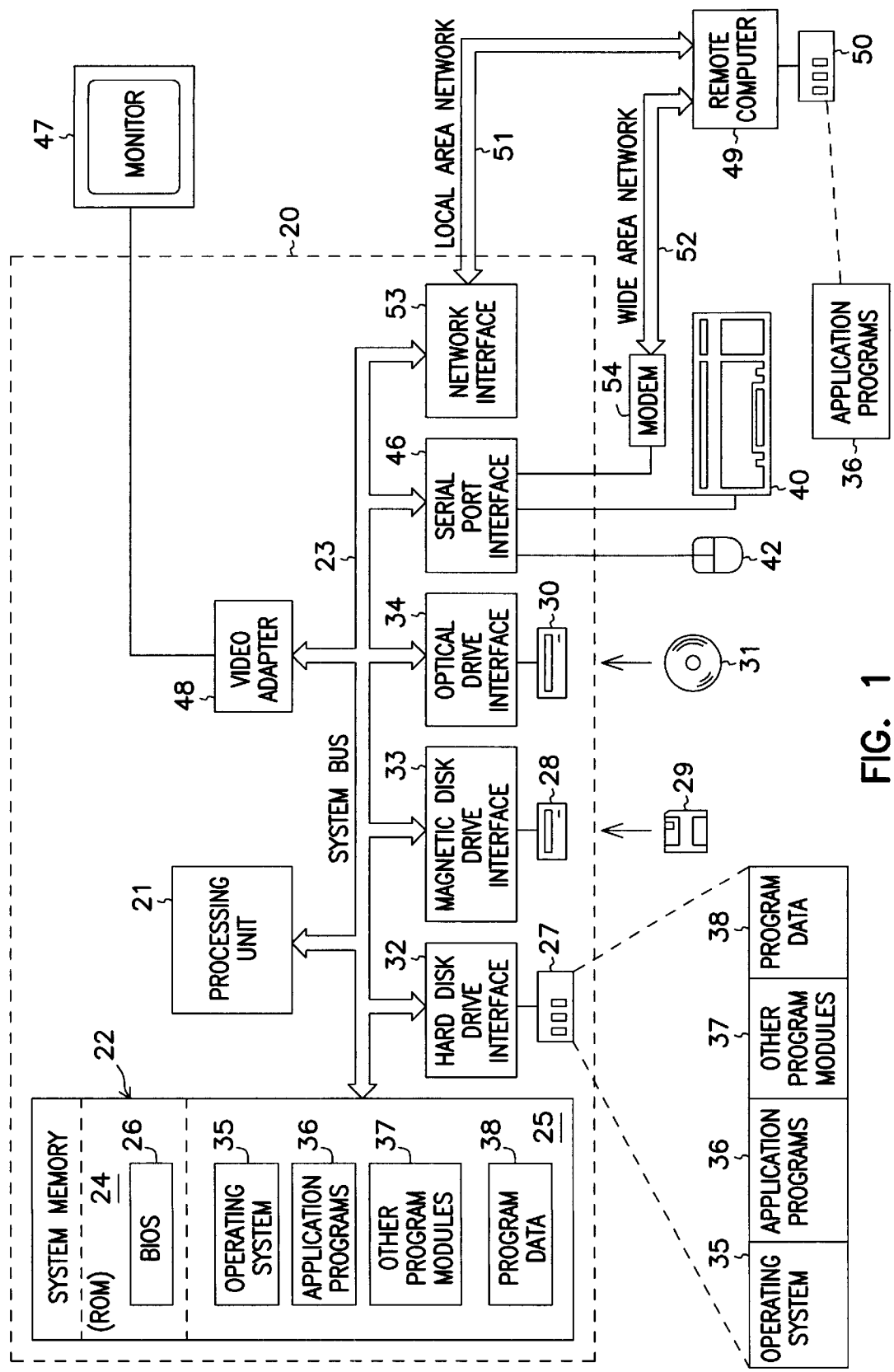
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

In this section of the detailed description, a system according to an embodiment of the invention is described.

The system can in one embodiment be implemented on a computer as is described in the previous section. Further, description of the system of one embodiment is made in reference to FIG. 2 and FIG. 3.

Figure 2:
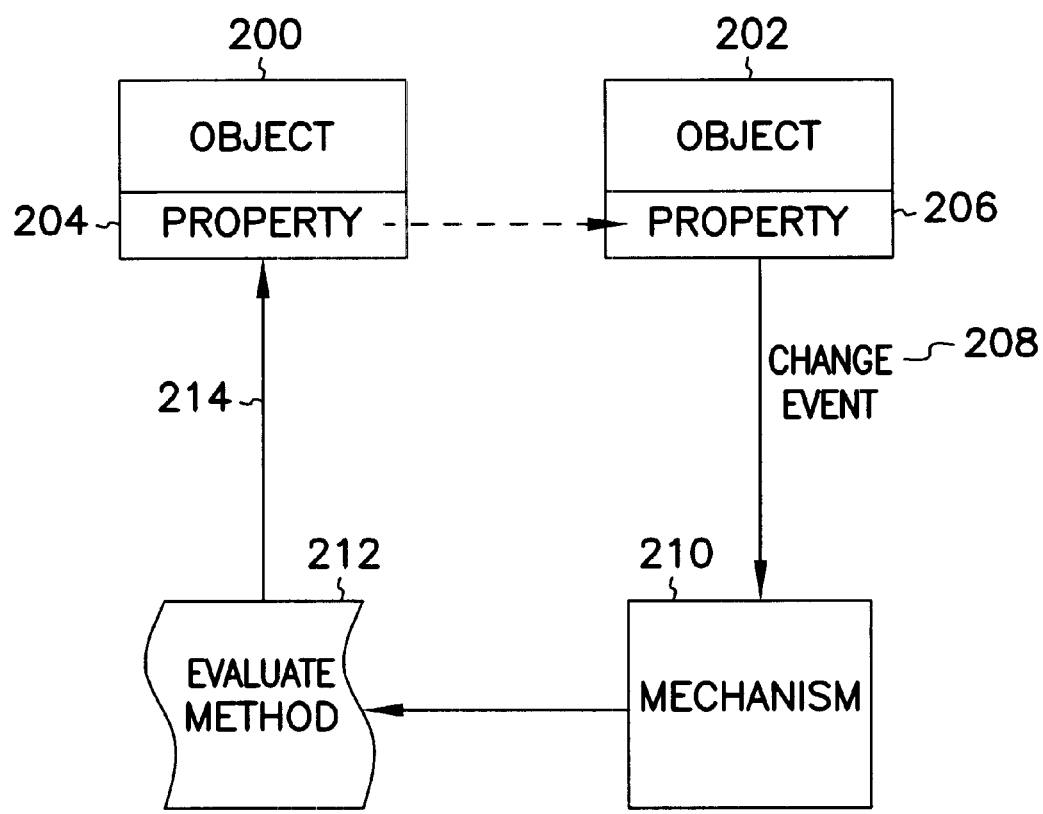
FIG. 2 shows a block diagram of a system according to one embodiment of the invention.

Referring first to FIG. 2, a system according to one embodiment of the invention is shown. The system includes objects 200 and 202. Each of objects 200 and 202 is a software object as is used in object-oriented programming environments. Such an object is a variable comprising both routines and data that is treated as a discrete entity. The utilization of objects to create a software program can be referred to as object technology. Object technology is referred to as the use of objects as the building blocks for applications. Objects are independent program modules written in object-oriented programming languages. Object technology is specifically described in David A. Taylor, *Object Technology: A Managers Guide* (2d ed. 1997) (ISBN 0-201-30994-7), which is hereby incorporated by reference. Objects are also known as containers and controls to those of ordinary skill within the art. In one embodiment, each object 200 and 202 is an object for use with the Component Object Model (COM) as available from Microsoft Corp., and as known within the art. The COM architecture is specifically described in Don Box, *Essential COM* (1997) (ISBN 0-201-63446-5), which is hereby incorporated by reference. In another embodiment, each object 200 and 202 is a container object as described in the applications previously incorporated by reference.

Each object 200 and 202 has at least one property; as shown in FIG. 2, object 200 has a property 204, and object 202 has a property 206. A property is an attribute, characteristic or parameter of an object. For example, a property of an object may be the color of a button control, the text of a text entry box, etc. As shown in FIG. 2, property 204 of object 200 is linked to property 206 of object 202. This means that the state of property 204 is dependent on the state of property 206. The properties are linked in one embodiment by a predetermined criteria. For example, the state of property 204 can be set equal to the state of property 206; thus, if the state of property 206 is TRUE (where property 206 is a boolean-type property), then the state of property 204 is TRUE as well. In one embodiment, property 204 is linked to property 206 by creating another object of a form PropertyAlias (property 204 of object 200, property 206 of object 202).

When either the property 204 or the property 206 changes, a corresponding event regarding the change is generated, such that the object corresponding to that property can in one embodiment act on the change (the object 200, for example, in the case of the property 204, and the object 202 in the case of the property 206). An event is an action or occurrence (e.g., such as the changing of the state of property 206). The programming environment of the system of FIG. 2 is thus event driven in one embodiment, that is, an environment in which objects or applications are triggered by events, as opposed to being procedure oriented, as known in the art. Thus, as shown in FIG. 2, when the property 206 specifically changes—that is, when its state changes—a change event 208 is generated. The change event 208 is monitored by the mechanism 210.

The mechanism 210 is software, such as that which can be encapsulated in a software object or component, that responds to the change event 208. In one embodiment, the mechanism 210 resides within a cache, such as that described in the applications previously incorporated by reference. In response to the occurrence of the change event 208, the mechanism 210 triggers or invokes the performance of an evaluate method 212 regarding the linking of the property 204 and the property 206.

The evaluate method 212 is a method, which in object-oriented programming environments is a process performed by an object (e.g., such as the mechanism 210). The evaluate method 212 specifically assesses the change in the property 206 to determine whether a change in the property 204 is required, according to the predetermined criteria by which the property 204 is linked to the property 206, and make the change to the property 204 if necessary. That is, the method 212 causes a predetermined change in the property 204 based on the change in the property 206. For example, the property 204 may be a boolean-type property and the property 206 may be a integer-type property, such that the property 204 is TRUE when the property 206 is less than 10, and FALSE otherwise. If the property 206 changes from 5 to 7, the evaluate method 212 would determine that a change to the property 204 is not necessary, whereas if the property 206 changes from 5 to 12, the evaluate method 212 would determine that a change to the property 204 from TRUE to FALSE is required, and would make this change. The change made by the evaluate method 212 to the property 204 is indicated in FIG. 2 by arrow 214.

In one embodiment, the objects of FIG. 2 are executed on a computer, such as that described in the previous section of the detailed description. In particular, the computer can include a processor and a computer-readable medium such as a memory or hard disk drive. There is data stored on the medium to represent the object 200, and also data stored on the medium to represent the object 202. Furthermore, there is a computer program stored on the medium, to invoke the evaluate method in response to an event regarding a change in the property 206 of the object 202. Other properties and other objects can also be represented by data stored on the computer-readable medium.

Those of ordinary skill within the art can appreciate that embodiments of the invention can extend the linking of properties of objects beyond that which is shown and described in FIG. 2. For example, in another embodiment, a third property can exist—either of the object 200, 202, or a completely different object—such that the evaluate method is to cause the predetermined change in the property 204 based on a change in the property 206 and a change in the third property. For example, the property 204 may be linked to the property 206 and the third property via the predetermined criteria: property 204 equals the logical AND of the property 206 and the third property. The invention is not so limited, however.

Figure 3:
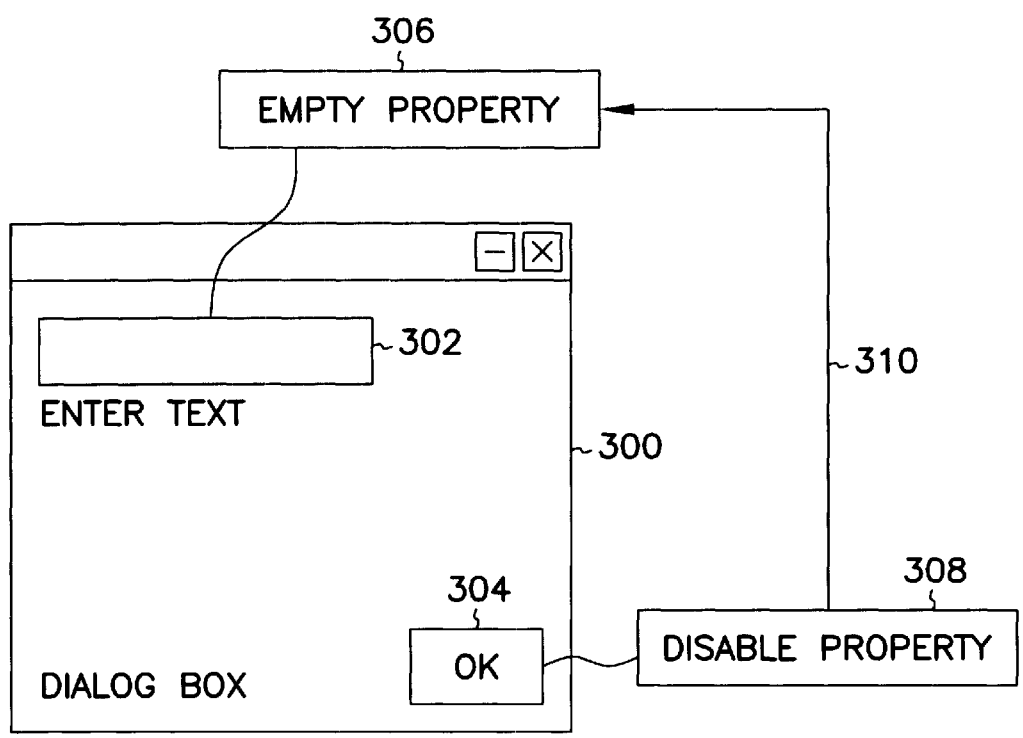
FIG. 3 shows a diagram of an example dialog box in conjunction with which an embodiment of the invention may be implemented; and, FIG. 4 shows a flowchart of a method according to an embodiment of the invention.

An illustrative example of an embodiment in accordance with the system of FIG. 2 is shown in FIG. 3. FIG. 3 shows a diagram of a dialog box used in graphical user interfaces, and in conjunction with which an embodiment of the invention can be practiced. Referring to FIG. 3, the dialog box 300 includes a text entry box 302 and an "OK" button 304. Each of the box 302 and the button 304 may have an object associated therewith. The object for the box 302 has an EMPTY property 306, which is TRUE if there has been no text entered in the box 302. The object for the "OK" button 304 has a DISABLED property 308, which indicates that the button 304 is disabled (i.e., cannot be actuated or clicked on) or enabled—and thus is TRUE if the button 304 is disabled. The property 308 is linked to the property 306, as shown in FIG. 3 by arrow 310. The predetermined criteria for the linking of the property 308 to the property 306 is DISABLED=EMPTY—indicating that the boolean value of the property 308 is set as equal to the boolean value of the property 306.

Initially, the EMPTY property 306 and the DISABLED property 308 are both set to TRUE. That is, there is no text in the box 302, and the button 304 is disabled. Upon the entering of text in box 302, for example, by a user typing on a keyboard, the EMPTY property 306 changes from TRUE to FALSE, and a corresponding change event is generated. The mechanism monitoring this change event thus invokes an evaluate method in response. The evaluate method determines that the DISABLED property 308 must also change, and another change event may be generated which causes objects relying upon this property 308 to retrieve its current value. Retrieving the value obtains the evaluated property 306. The property 308 does not change, but rather signifies that it has changed by throwing an event; those objects interested in this property, will then get the value. Thus, the notification is transparent to the developer.

Those of ordinary skill within the art can appreciate that embodiments of the invention are not limited to visual-oriented objects such as the example shown in FIG. 3. That is, embodiments of the invention may also be applied to non-visual objects. For example, when a user inserts a disk into a floppy disk drive, a change event may be generated, such that a property linked to a "disk in drive" property is changed by the invocation of an appropriate evaluate method by a mechanism. The invention is not so limited, however.

Method

In this section of the detailed description, a computer-implemented method according to an embodiment of the invention is described. The method may be the evaluate method as described in the previous section of the detailed description, in one embodiment. The description is provided in reference to FIG. 4. The method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Figure 4:
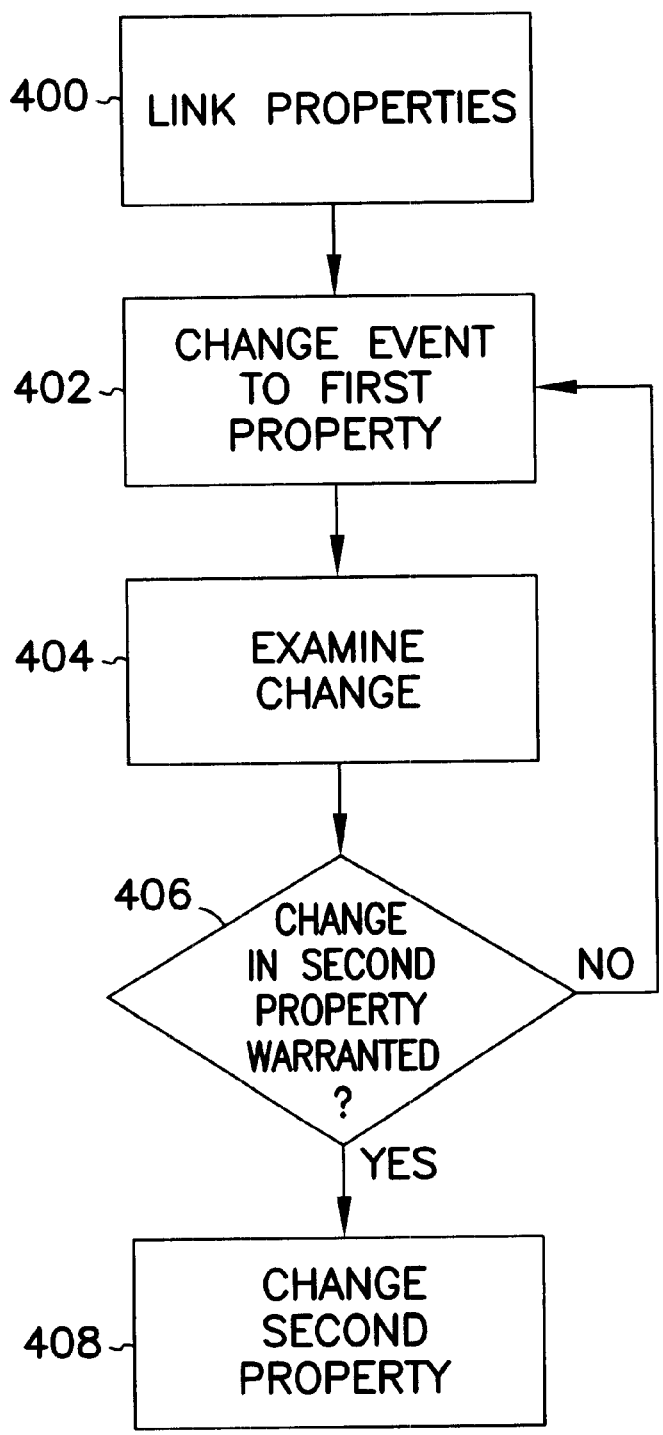

Referring now to FIG. 4, a flowchart of a method according to one embodiment of the invention is shown. In 400, a second property of a second object is linked to a first property of a first object, according to a predetermined criteria. Upon the changing of the first property, a change event occurs regarding the change in 402. In 404, this change in the first property is examined in relation to the predetermined criteria linking the second property to the first property. That is, in 406, it is determined whether the change in the first property in relation to the predetermine criteria necessitates a change in the second property. If not, then the method returns to 402; otherwise, in 408, the second property is changed according to the predetermined criteria.

For example, a second property of a second object may be a boolean-type property linked in 400, to a first property of a first object that is also a boolean-type property, via the criteria that the second property is the logical NOT of the first property. Thus, when a change event regarding the first property occurs in 402, indicating that the first property has changed, for example, from FALSE to TRUE, this change is examined in 404 to determine whether a change in the second property is necessary. Because a change in the first property from FALSE to TRUE requires a corresponding change in the second property from TRUE to FALSE, from 406 the method proceeds to 408, where this change to the second property is made.

CONCLUSION

Property linking has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:

linking a second property of a second object to a first property of a first object according to a set of criteria, the set of criteria forming a programmatic dependency between the second property of the second object and the first property of the first object;

upon occurrence of an event regarding a change in the first property, examining the change in the first property in relation to the set of criteria linking the second property to the first property;

determining whether the change in the first property in relation to the set of criteria necessitates a change in the second property; and changing the second property according to the set of criteria upon determining that the change in the first property in relation to the set of criteria necessitates the change in the second property.

2. The method of claim 1, wherein linking comprises creating a third object, the third object being capable of executing the act of linking the first property of the first object to the second property of the second object.

3. A computerized system comprising:

a first object having a first property;

a second object having a second property, the second property being linked to the first property according to a set of criteria, the set of criteria forming a programmatic dependency between the second property of the second object and the first property of the first object; and a mechanism to invoke an evaluate method in response to an event regarding a change in the first property, the method causing a change in the second property based on the change in the first property, the evaluate method comprising:

examining the change in the first property in relation to the set of criteria linking the second property to the first property;

determining whether the change in the first property in relation to the set of criteria necessitates a change in the second property; and changing the second property according to the set of criteria upon determining that the change in the first property in relation to the set of criteria necessitates the change in the second property.

4. The system of claim 3, further comprising a third property to which the second property is linked, the evaluate method causing the change in the second property based on the change in the first property and a change in the third property.

5. The system of claim 3, wherein the first property of the first object is linked to the second property of the second object by creating a third object, the third object linking the first property of the first object to the second property of the second object.

6. The system of claim 3, wherein the mechanism comprises a cache.

7. The system of claim 3, wherein the first object is to act on an event regarding a change in the first property.

8. A computer-readable medium having a computer program stored thereon for execution on a computer to cause performance of a method comprising:

linking a second property of a second object to a first property of a first object according to a set of criteria, the set of criteria forming a programmatic dependency between the second property of the second object and the first property of the first object;

upon occurrence of an event regarding a change in the first property, examining the change in the first property in relation to the set of criteria linking the second property to the first property;

determining whether the change in the first property in relation to the set of criteria necessitates a change in the second property; and changing the second property according to the set of criteria upon determining that the change in the first property in relation to the set of criteria necessitates the change in the second property.

9. A computer comprising:

a processor;

a computer-readable medium;

a first piece of data stored on the medium for representing a first object having a first property;

a second piece of data stored on the medium for representing a second object having a second property, the second property being linked to the first property according to a set of criteria, the set of criteria forming a programmatic dependency between the second property of the second object and the first property of the first object; and a computer program stored on the medium to invoke an evaluate method in response to an event regarding a change in the first property, the method causing a change in the second property based on the change in the first property and comprising:

examining the change in the first property in relation to a set of criteria linking the second property to the first property;

determining whether the change in the first property in relation to the set of criteria necessitates a change in the second property; and changing the second property according to the set of criteria upon determining that the change in the first property in relation to the set of criteria necessitates the change in the second property.

10. The computer of claim 9, further comprising a third piece of data stored on the medium for representing a third property to which the second property is linked, the evaluate method causing the change in the second property based on the change in the first property and a change in the third property.

11. The computer of claim 9, wherein the mechanism comprises a cache.

12. The computer of claim 9, wherein the first object is to act on an event regarding a change in the first property.

\* \* \* \* \*

UNITED STATES PATENT AND TRADEMARK OFFICE
CERTIFICATE OF CORRECTION

PATENT NO.    : 6,473,769 B1
DATED         : October 29, 2002
INVENTOR(S)   : F.G.T.I. Andrew et al.

It is certified that error appears in the above-identified patent and that said Letters Patent is hereby corrected as shown below:

Title page,
Item [56], References Cited, U.S. PATENT DOCUMENTS, "Martinez et al." should read -- Martinez, Jr. et al. --

Column 1,
Line 9, after "09/200,489];" delete "to now"
Line 12, "Object Oriented" should read -- Object-Oriented --

Signed and Sealed this

Twelfth Day of August, 2003

JAMES E. ROGAN
*Director of the United States Patent and Trademark Office*